J. L. DAVIDSON.
AUTO LOCK.
APPLICATION FILED NOV. 13, 1916.
1,217,419.
Patented Feb. 27, 1917.
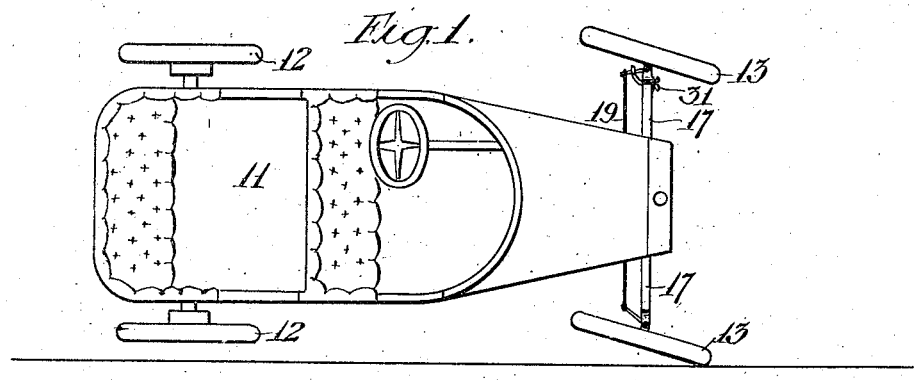
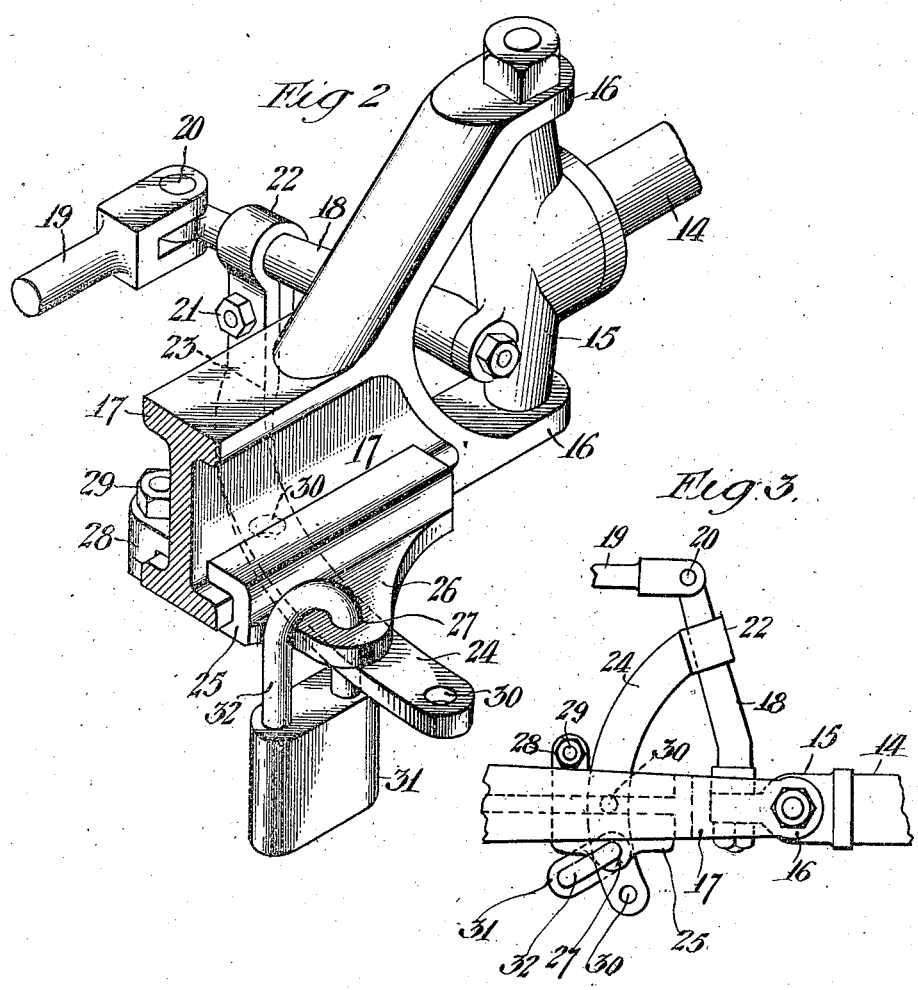
Inventor
James L. Davidson
by Graham & Harris
Attorneys

UNITED STATES PATENT OFFICE.

JAMES L. DAVIDSON, OF ALHAMBRA, CALIFORNIA.

AUTO-LOCK.

1,217,419.  Specification of Letters Patent.  Patented Feb. 27, 1917.

Application filed November 13, 1916. Serial No. 131,172.

*To all whom it may concern:*

Be it known that I, JAMES L. DAVIDSON, a citizen of the United States, residing at Alhambra, in the county of Los Angeles and State of California, have invented a new and useful Auto-Lock, of which the following is a specification.

My invention relates to automobiles, trucks or similar vehicles, and the principal object of my invention is to provide means for locking an automobile in such a manner that it cannot be stolen.

A further object of the invention is to apply the lock in such a manner and at such a place that it cannot readily be removed or tampered with.

Further objects and advantages will be made evident hereinafter. Referring to the drawing, which is for illustrative purposes only, Figure 1 is a plan view of an automobile equipped with my invention, the parts being shown in the locked position.

Fig. 2 is a perspective view of the invention, and Fig. 3 is a plan view of the invention.

In the embodiment of the invention shown in the drawings, an automobile 11, is equipped with rear wheels 12, and front wheels 13. Each of the front wheels 13, is mounted to turn freely on a stub axle 14, which is mounted on a steering knuckle 15, having vertical bearings at the top and bottom thereof, turning freely in extensions 16, of a fixed axle 17. The end of the axle 17 only is shown in Fig. 2, this axle extending across the car as shown in plan, in Fig. 1. Secured to the steering knuckle 15, is a steering arm 18, to which a steering rod 19 is pivoted by a bolt 20.

All of the above enumerated parts are standard in automobile construction, and form no part of my invention, and other well-known mechanical equivalents may be substituted therefor without departing from the spirit of my invention.

Mounted by convenient means, such as the bolt 21, on the arm 18, is a segment 22, this segment extending downwardly and being bent at 23. The end of segment 22, shown at 24, forms an arc of a circle which is struck from the vertical axis of the steering knuckle 15. A plate 25, having an ear 26, and a hole 27, formed therein, is secured on the fixed axle 17 by any convenient means, that shown consisting of a clip 28 and a bolt and nut 29. The member 24, has a series of holes 30 cut therein. These holes being in such a position as to register with the holes 27 as the wheels 13 are turned.

A padlock 31, having a hasp 32, is provided, the hasp 32 being of proper size to pass through the holes 27 and 30.

The method of operation of my invention is as follows:

The padlock 31, is removed when the automobile is being operated. Whenever it is desired to lock the automobile, it is run up along the side of the curb, or the side of the road, and the wheels are turned at an angle as shown in Fig. 1, this movement being regulated so that one of the holes 30, registers with the hole 27, and the hasp 32 of the padlock 31 is passed through the holes 27 and 30.

When so locked, it is impossible to steer the automobile in any direction other than a circle, and the automobile is practically unmanageable.

A somewhat similar result can be obtained by locking the wheels 13 in their straight position, so that the automobile is constrained to travel in a straight line, the course of our highways being such that no vehicle can travel for a very long time in a straight line.

I am aware that various inventors have proposed to lock the steering wheel of an automobile so that it cannot be turned, but such inventions are inferior to mine, for the reason that they are not applied directly to the steering knuckle, and can therefore be more easily tampered with.

I claim as my invention:—

1. In an automobile; a steering knuckle; a stub axle on said knuckle; a front wheel on said stub axle; a fixed axle in which said steering knuckle is pivoted; a segment secured rigidly to said steering knuckle; and means for locking said segment to said fixed axle.

2. In an automobile; a steering knuckle;

a stub axle on said knuckle; a front wheel on said stub axle; a fixed axle in which said steering knuckle is pivoted; a segment secured rigidly to said steering knuckle and having a hole therein; a plate secured to said fixed axle and having a hole therein; and locking means adapted to pass through said holes and lock said plate and segment together.

In testimony whereof, I have hereunto set my hand at Los Angeles, California, this 6th day of November, 1916.

JAMES L. DAVIDSON.